(12) United States Patent
Shinohe et al.

(10) Patent No.: US 6,697,050 B1
(45) Date of Patent: Feb. 24, 2004

(54) MOUSE WITH A WHEEL

(75) Inventors: Akihiro Shinohe, Fukushima-ken (JP); Kouichi Ogino, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/499,573

(22) Filed: Feb. 7, 2000

(30) Foreign Application Priority Data

Feb. 8, 1999 (JP) .......................................... 11-030703

(51) Int. Cl.[7] .................................................. G09G 5/08
(52) U.S. Cl. ..................................................... 345/163
(58) Field of Search ............................... 345/156, 157, 345/158, 159, 160, 163, 164, 167

(56) References Cited

U.S. PATENT DOCUMENTS 5,473,344 A  12/1995  Bacon et al. ............... 345/163
5,760,765 A  * 6/1998  Wu .............................. 345/163

* cited by examiner

Primary Examiner—Vijay Shankar
(74) Attorney, Agent, or Firm—Brinks Hofer Gilson & Lione

(57) ABSTRACT

A mouse with a wheel, including a gear coaxially mounted to a rotary shaft of the wheel; a rocking member in which rocking arms extend from both sides thereof with a rocking shaft formed parallel to the rotary shaft as a center; a pawl member mounted to the rocking member and biased so as to engage the gear; and contact switches disposed at locations that allow them to contact the respective rocking arms, in which when one side of the rocking member rocks, a counter circuit at a side of the corresponding rocking arm is brought into a electrical conduction. The mouse has a non-photo- and simple structure.

2 Claims, 2 Drawing Sheets

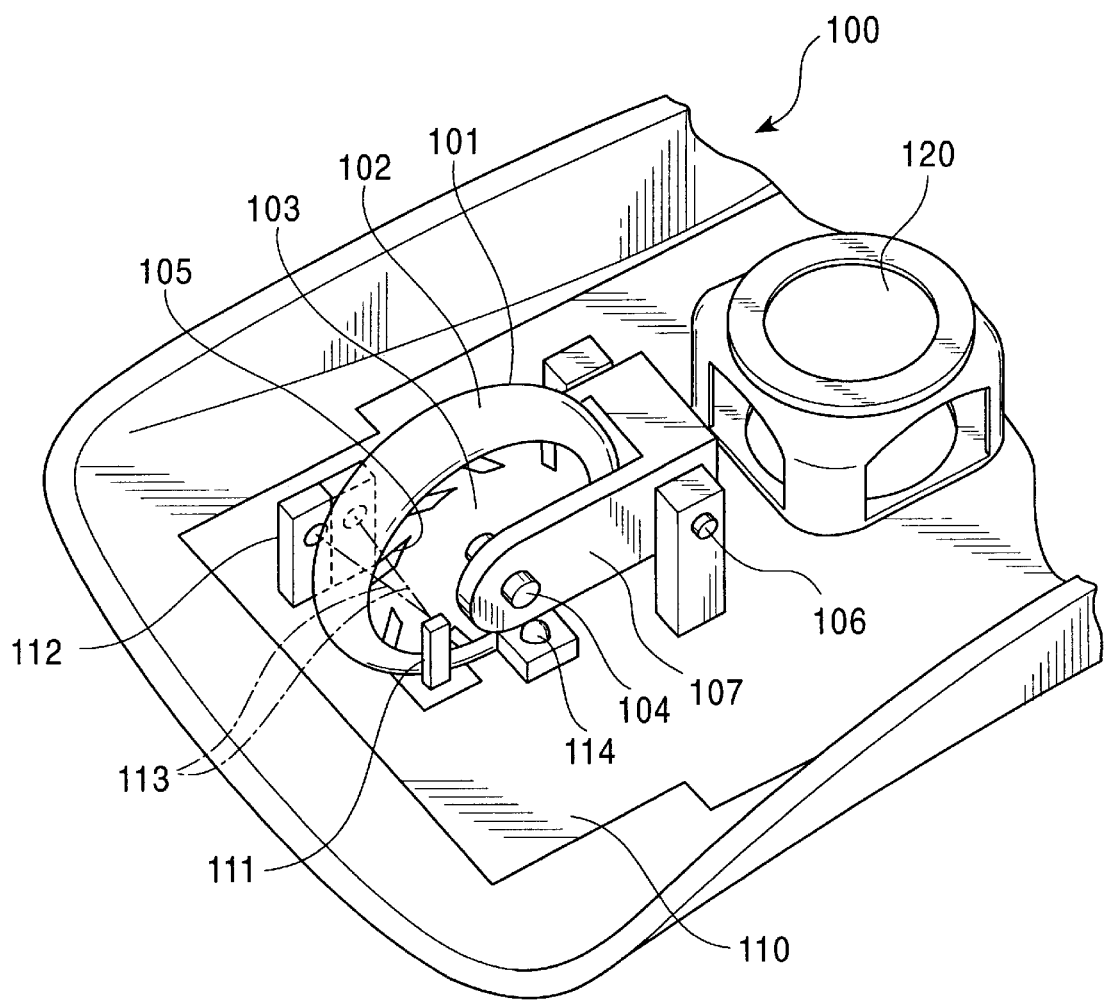

MOUSE WITH A WHEEL

BACKGROUND OF THE INVENTION

1. Field of the Invention

The present invention relates to a mouse with a wheel, for controlling an image on a display device, and more particularly to a mouse with a wheel, which has a simple and non-photo-mechanism for measuring the direction and amount of rotation of the wheel.

2. Description of the Related Art

A mouse is frequently used as an auxiliary input device of a computer. In recent years, there has been a demand for mice that provide a variety of functions. The use of mice with a wheel, for scrolling an image on a display device are becoming widespread. The wheel is mounted so that a portion of the circumference thereof is exposed from a top cover of the mouse. When a user rotates a peripheral edge portion of the wheel with his or her finger in one direction, the image is scrolled upward or downward depending on the direction in which the wheel is rotated, and by an amount depending on the amount by which the wheel is rotated. There is a type of mouse having a mechanism that allows scrolling of an image as a result of rotation of a mouse ball when a user presses the wheel downward.

FIG. 3 illustrates a wheel mechanism used in a conventional mouse.

In FIG. 3, a mouse 100 comprises a wheel 101. A portion of a circumferential portion 102 of the wheel 101 is exposed to the outside from an opening in a top cover (not shown). A plurality of slits 105 are formed at a hub 103 of the wheel 101 so as to extend radially from a rotary shaft 104.

The rotary shaft 104 of the wheel 101 is axially supported by a rocking arm 107 which can rock upward or downward with a rocking shaft 106 as a center. The rocking arm 107 is biased upward by a spring (not shown). A mode change-over switch 114 is mounted below the rocking arm 107. It is provided to bring a mode change-over electrical circuit into electrical conduction when the user presses the wheel 101 downward with his or her finger and causes the mode change-over switch 114 to come into contact with the rocking arm 107.

An optical sensor comprising a set of a light-emitting element 111 and a light-receiving element 112 is provided on a circuit board 110 of the mouse 100. The light-receiving element 112 comprises two light-receiving diodes arranged side by side. After the passage of beams 113 emitted from the light-emitting element 111 through slits 105, the two light-receiving diodes successively receive the beams 113.

An image-controlling ball mechanism 120 (not described in detail) is mounted to the mouse 100.

When the user rotates the wheel 101 of the mouse 100 with his or her finger, the slits 105 of the wheel 101 cause pulsation of the beams 113 emitted from the light-emitting element 111, so that the beams 113 reach the light-receiving element 112 as pulses of light. Therefore, when one pulse of light is defined as one count, the amount by which the wheel 101 is rotated is converted into number of counts in digital form, and the result is sent to a computing device. On the other hand, by detecting the order in which the two light-receiving diodes of the light-receiving element 112 receive light, the direction of rotation of the wheel 101 is determined. From the direction of rotation and the number of counts of rotation of the wheel 101, the computing device causes an image to be scrolled either upward or downward by a required amount.

On the other hand, when the user presses the wheel 101 downward with his or her finger, the mode change-over switch 114 is brought to a state allowing electrical conduction, and the rotation of the ball mechanism 120 allows scrolling of an image, so that the function of the ball mechanism 120 can be changed.

The conventional mouse allows an image to be easily scrolled by the above-described wheel mechanism. However, this mechanism has the following problems. The properties of the light-emitting element 111 and the light-receiving element 112 must match and a light path must be precisely adjusted, making the assembly operation complicated. In addition, the unit including the photo-elements are expensive, resulting in high manufacturing costs. Further, since the photo-unit is always on during input operations, a large amount of electrical power is consumed.

SUMMARY OF THE INVENTION

To overcome the above-described problems, it is an object of the present invention to provide a mouse with a wheel, having a simple and non-photo-mechanism for measuring the direction and amount of rotation of the wheel.

To this end, according to the present invention, there is provided a mouse with a wheel, comprising:

- a gear coaxially mounted to a rotary shaft of the wheel;
- a rocking member in which rocking arms extend from both sides thereof with a rocking shaft formed parallel to the rotary shaft of the wheel as a center;
- a pawl member mounted to the rocking member, the pawl member being biased so as to engage the gear; and
- contact switches disposed at locations that allow the contact switches to come into contact with the rocking arms corresponding thereto, in which when the rocking member rocks to one side, the corresponding contact switch comes into contact with the corresponding rocking arm in order achieve electrical conduction;
- wherein the contact switches are connected to a counter circuit for determining an amount of rotation of the wheel.

In the mouse with a wheel, when a user rotates the wheel in one direction with his or her finger, the gear coaxially mounted to the wheel rotates in the same direction, causing a crest of the gear to push the pawl member, biased so as to engage the gear, in the direction of rotation. This causes the rocking member to rock in one direction, causing the corresponding arm to push the corresponding contact switch disposed at the location allowing it to contact this arm. When the corresponding contact switch contacts the arm, this switch is brought to a state allowing electrical conduction. When the biased pawl member moves over a crest of the gear as a result of further rotation of the wheel, the rocking member returns to its neutral position, whereby the contact switch is brought to a state not allowing electrical conduction.

Since the contact switches are disposed so that they can contact their corresponding rocking arms, and the contact switches are connected to corresponding counter circuits, it is possible to detect the direction of rotation of the wheel based on which counter circuit is in electrical conduction. In addition, since the corresponding counter circuit is brought into or out of conduction each time the pawl member moves over a crest of the gear, when a pulse is defined as one count, the amount by which the wheel is rotated can be detected as number of counts in digital form. A computing device computes the detected direction and amount of rotation of the wheel in order to the control the image on a display device such that the image is scrolled, for example, either upward or downward by a required amount.

Although not exclusive, at least one end portion of the rotary shaft of the wheel may be made vertically movable, the movable end portion of the rotary shaft being biased upward; and the mouse may further comprise a mode change-over switch, disposed below the movable end portion, for changing a function of a ball of the mouse.

In this case, when a user presses the wheel downward with his or her finger, the movable end portion of the rotary shaft of the wheel moves downward to push the mode change-over switch and bring the mode change-over circuit into electrical conduction. When the user stops pressing the wheel, the movable end portion returns to its initial position to bring the mode change-over switch into the state not allowing electrical conduction. Therefore, when the mouse is moved and the ball is rotated while the wheel is pressed downward, it is possible to change ball functions to allow the image on the display device to be scrolled by a predetermined amount not only in the vertical directions, but also in horizontal directions and oblique directions.

BRIEF DESCRIPTION OF THE DRAWINGS

FIG. 3 is a perspective view of a conventional mouse with a wheel.

DESCRIPTION OF THE PREFERRED EMBODIMENT

A description will now be given of an embodiment of the present invention with reference to the figures. Although, a wheel and a mode change-over mechanism are described in the description below as providing scrolling functions for scrolling an image on a display device, the wheel and/or the mode change-over mechanism can provide other functions, which can be arbitrarily selected in accordance with the computer software used.

Figure 1:
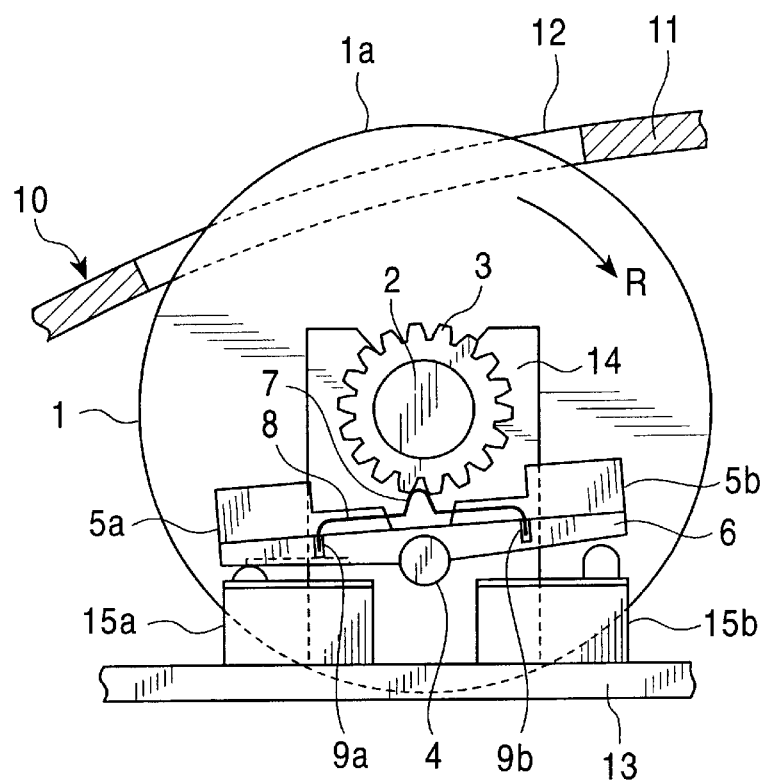
FIG. 1 is a side view of an embodiment of the mouse in accordance with the present invention, as viewed in an axial direction of rotation of a wheel.

In FIG. 1, a mouse 10 comprises a wheel 1 for scrolling an image on a display device. A portion 1a of a circumferential portion of the wheel 1 is exposed to the outside from an opening 12 formed in a top cover 11 of the mouse 10. In the wheel 1, a rotary shaft 2 is supported by a bearing plate 14 formed in a standing manner from a base 13 of the mouse 10.

A gear 3 is coaxially mounted to an extended end portion of the rotary shaft 2 of the wheel 1. A rocking shaft 4 formed parallel to the rotary shaft 2 of the wheel 1 is supported by the bearing plate 14. A rocking member 6 in which rocking arms 5a and 5b extend from both sides thereof with the rocking shaft 4 as a center is mounted to the rocking shaft 4.

A pawl member 7 is mounted to the rocking member 6. It is formed by forming a center portion of a spring member 8 into a convex-shape. Both end portions of the plate spring member 8 are supported by spring receivers 9a and 9b formed in the rocking member 6. By virtue of this structure, the pawl member 7 is biased upward so as to engage the gear 3.

Two contact switches (microswitches) 15a and 15b are mounted to the base 13. They are disposed at locations that allow them to come into contact, respectively, with the rocking arms 5a and 5b provided at the rocking member 6. When the rocking member 6 rocks to one side, the corresponding rocking arm 5a or rocking arm 5b comes into contact with and pushes the contact switch 15a or the contact switch 15b, whereby electrical conduction is achieved. The contact switches 15a and 15b are connected to counter circuits (not shown) for computing the amount of rotation of the wheel 1.

FIG. 1 shows a state in which the contact switch 15a is brought to a state allowing electrical conduction after the rocking arm 5a has been pushed downward by rocking the rocking member 6. In this state, the other contact switch 15b is not in contact with the rocking arm 5b, so that it is in a state not allowing electrical conduction.

When the mouse 10 is used, and a user rotates the exposed portion 1a of the wheel 1 clockwise in the direction of arrow R in FIG. 1, the gear 3 mounted coaxially to the rotary shaft 2 rotates in the direction of arrow R. The rotation pushes the pawl member 7 engaging the gear 3 leftward in FIG. 1, causing the rocking member 6 to rock such that the rocking arm 5a moves downward. The rocking arm 5a moves downward and comes into contact with the contact switch 15a. When a switch lever is pushed, the contact switch 15a is brought to the state allowing electrical conduction.

When the wheel 1 rotates further, the rocking member 6 cannot rock further because the rocking arm 5a is in contact with the contact switch 15a. Therefore, the pawl member 7 moves downward in opposition to the biasing force, and over a crest of the gear 3 and down into a next trough. In this state, since the rocking member 6 returns to a neutral position, the rocking arm 5a moves away from the contact switch 15a, as a result of which the contact switch 15a is brought into the state not allowing electrical conduction.

More specifically, each time the pawl member 7 moves over one crest of the gear 3, the contact switch 15a is brought into the state allowing electrical conduction/the state not allowing electrical conduction, causing one count pulse signal to be generated at the corresponding counter circuit. On the other hand, when the wheel 1 is rotated in a direction opposite to the direction of arrow R, the contact switch 15b obviously similarly generates one pulse signal.

In this way, when the wheel 1 is rotated in the direction of arrow R or in the direction opposite thereto by a certain amount, switching between the contact switches 15a and 15b that are brought into the state allowing electrical conduction occurs based on the direction in which the wheel 1 is rotated, and a pulse count signal is generated to the corresponding counter circuit based on the amount by which the wheel 1 is rotated. A controlling device makes a detection as to whether or not one of the contact switches has been brought into the state allowing electrical conduction in order to determine the vertical scrolling direction of an image, and make a detection of the number of counts in order to determine the scrolling amount of the image.

In the mouse 10 of the embodiment, a photo-means for detecting the amount of rotation of the wheel is not used, making it unnecessary to carry out troublesome operations such as property matching of the photo-elements and adjustment of an optical path. In addition, image scrolling can be achieved using a simple mechanism comprising a gear, a plate spring, a rocking member, and contact switches. Further, since an operator experiences a tactile feel on his or her finger each time the pawl member 7 moves over one crest of the gear 3, he or she can quantitatively determine the amount of rotation of the wheel by the feel on his or her finger.

Figure 2:
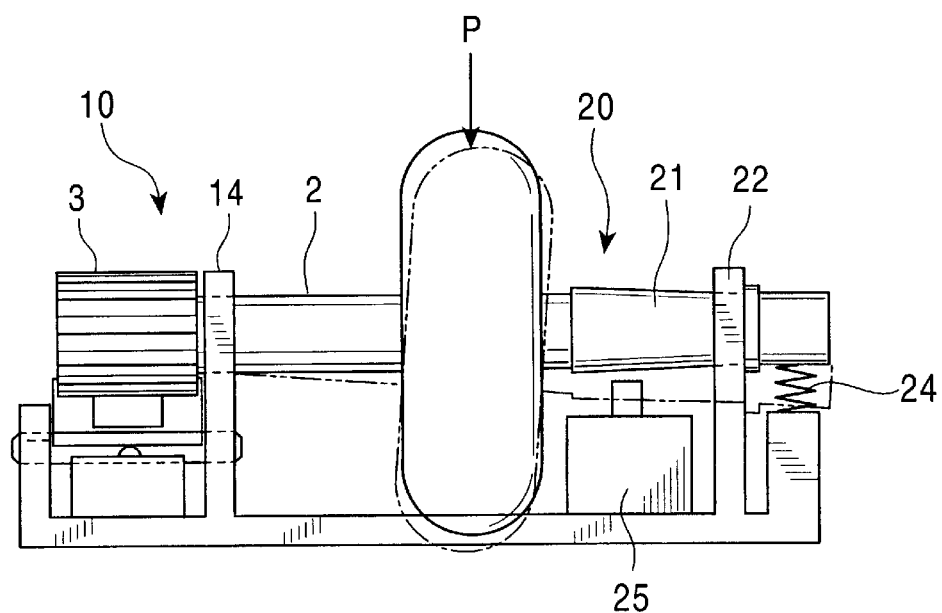
FIG. 2 is a side view of the embodiment of the mouse, as viewed in a vertical direction of FIG. 1.

As shown in FIG. 2, the mouse 10 comprises a mode change-over mechanism 20 which allows scrolling of an image by the rotation of a mouse ball. More specifically, in the wheel 1, one of the end portions of the rotary shaft 2 is supported by the bearing plate 14, and the gear 3 is mounted to an end portion extending beyond the end portion that is supported. A movable end portion 21 is coaxially formed at the other of the end portions (that sandwiches the wheel 1) of the rotary shaft 2. The movable end portion 21 is supported by a bearing plate 22 with a bearing hole in which the moving end portion 21 can loosely and rockably move vertically. The movable end portion 21 is always biased at its upper initial position (indicated by a sold line in FIG. 2) by a spring 24.

A mode change-over switch 25 is disposed below the movable end portion 21. The mode change-over switch 25 is such as to bring into electrical conduction a mode change-over circuit which allows scrolling of an image on a display device by the rotation of the ball (not shown) built in the mouse 10.

When the operator presses the wheel 1 down with his or her finger, a pressing force P causes the rotary shaft 2 to move such that the moving end portion 21 moves downward as indicated by alternate long and two short dashed lines in FIG. 2, with the bearing hole in the bearing plate 14 as a center. When the moving end portion 21 pushes the mode change-over switch 25, the mode change-over circuit is brought into electrical conduction. Therefore, when the mouse 10 is operated so as to rotate the ball while pressing the wheel 1 downward, scrolling of an image on a display device can be carried out not only vertically, but also horizontally and obliquely by a required amount, based on the direction and amount of rotation of the ball. When the pressing force P on the wheel 1 is removed, the movable end portion 21 returns to its original position by an opposing force of the spring 24, so that the mode change-over switch 25 is brought into the state not allowing electrical conduction. Consequently, the ball function is restored to its initial state.

The mouse 10 with the mode change-over mechanism 20 can scroll an image vertically while retaining the ordinary functions of the ball as a result of rotating the wheel 1. In addition, the mouse 10 allows a ball function to be switched to scroll mode when the wheel 1 is in a pushed-in state, so that by moving the mouse 10 itself an image can be easily scrolled not only vertically, but also horizontally and obliquely.

In the embodiment, one of the end portions of the rotary shaft 2 of the wheel 1 is supported by the bearing plate 14. Only the other of the end portions thereof is movable vertically. The rotary shaft 2 kept in a horizontal posture may be moved vertically by moving the bearing plates 14 and 22 vertically at the same time.

As mentioned above, the wheel 1 and/or the mode change-over mechanism 20 may have functions other than image scrolling functions, such as scaling functions, depending on the computer software used.

According to the present invention, the mouse with a wheel comprises a gear formed coaxially with the rotary shaft of the wheel; a rocking member in which the rocking arms extend from both sides thereof with the rocking shaft formed parallel to the rotary shaft as a center; a pawl member mounted to the rocking member, the pawl member being biased so as to engage the gear; and contact switches that are disposed so that they can contact their corresponding arms, and that cause the corresponding counter circuits disposed at the rocking arm sides to be brought into electrical conduction. Therefore, although the mouse has a simple and non-photo-mechanism, an image on a display device can be controlled by taking out the direction in which and the amount by which the wheel is rotated as pulse signals.

What is claimed is:

1. A mouse with a wheel, for controlling an image on a display device, comprising:

a gear coaxially mounted to a rotary shaft of the wheel;

a rocking member in which rocking arms extend from both sides thereof with a rocking shaft formed parallel to the rotary shaft of the wheel as a center;

a pawl member mounted to the rocking member, the pawl member being biased to engage the gear; and contact switches disposed at locations that allow the contact switches to come into contact with the rocking arms corresponding thereto, in which when the rocking member rocks to one side, the corresponding contact switch comes into contact with the corresponding rocking arm in order to achieve electrical conduction;

wherein when the contact switches are connected to a counter circuit for determining an amount of rotation of the wheel, and the wheel is rotated in one direction, the gear rotates in a same direction as the wheel rotates in order for a crest of the gear to push the pawl member in one direction, causing the rocking member to rock in one direction, so that the corresponding rocking arm comes into contact with the corresponding contact switch in order to bring the corresponding contact switch into a state allowing electrical conduction, after which when the pawl member moves over one crest of the gear, the rocking member returns to a neutral position in order to bring the corresponding contact switch into a state not allowing electrical conduction.

2. A mouse with a wheel according to claim 1, wherein at least one end portion of the rotary shaft of the wheel is made vertically movable, the movable end portion of the rotary shaft being biased upward; and wherein the mouse further comprises a mode change-over switch, disposed below the movable end portion, for changing a function of a ball of the mouse, in which while the wheel is being pressed downward, the mode change-over switch is brought into the state allowing electrical conduction.

* * * * *